UNITED STATES PATENT OFFICE.

GARLAND N. WHISTLER, OF FORT WADSWORTH, AND HENRY C. ASPINWALL, OF WEST NEW BRIGHTON, ASSIGNORS, BY MESNE ASSIGNMENTS, TO BENJAMIN S. HARMON, OF NEW YORK, N. Y.

SMOKELESS POWDER.

SPECIFICATION forming part of Letters Patent No. 541,911, dated July 2, 1895.

Application filed October 23, 1894. Serial No. 526,736. (No specimens.)

*To all whom it may concern:*

Be it known that we, GARLAND N. WHISTLER, of Fort Wadsworth, and HENRY C. ASPINWALL, of West New Brighton, in the county of Richmond, State of New York, have invented a new and useful Improvement in Explosive Compounds, of which the following is a specification.

Our invention relates to an improvement in explosive compounds particularly adapted for use as a gun powder of the smokeless type, and consists of nitroglycerin, gun cotton, potassium nitrate or barium nitrate, or their equivalents, a resin, such as gum kauri or shellac, and urea crystals. In selecting a deterrent for use with powders, it is important that the one to be used shall show no acid reaction or as little as possible, in the finished compound.

We have discovered that by using a resin, such for example as gum kauri or shellac, as a deterrent in connection with the several ingredients hereinabove enumerated, the acid reaction is almost or quite prevented, thus producing a stable compound.

In practice, seventy-five parts, by weight, of nitroglycerin and fifty parts, by weight, of gun cotton are mixed with twenty to twenty-five parts, by weight, of a nitrate such, for example, as barium nitrate, potassium nitrate, calcium nitrate, strontium nitrate, ammonium nitrate, and with this mixture is incorporated two parts, by weight, of urea crystals. To the above mixture there is added from one to seven parts, by weight, of a resin, such for example as gum kauri or shellac, the amount of the resin used being varied according to the caliber of the gun, or the use for which the explosive is intended. The smaller the caliber of the gun, the less the amount of resin to be used. In forming the mixture, should the elements not furnish a sufficiently liquefied mass to mix the several ingredients, acetone or other suitable solvent may be added in a sufficient quantity to make the mass the consistency of a thick liquid and then subsequently evaporated in any well known or approved manner. The resin which we prefer to use is the fossilized or mineral gum kauri.

What we claim is—

1. An explosive compound, composed of nitroglycerin, gun cotton, a nitrate, such for example as barium nitrate, a resin and urea crystals, substantially as set forth.

2. The fossilized or mineral gum kauri as a deterrent in a mixture containing nitroglycerin, gun cotton, and a nitrate, substantially as set forth.

GARLAND N. WHISTLER.
HENRY C. ASPINWALL.

Witnesses:
FREDK. HAYNES,
R. B. SEWARD.